Aug. 12, 1947.  A. J. WILLIAMS, JR., ET AL  2,425,408
FRICTIONAL DAMPING MEANS FOR GALVANOMETERS
Filed Nov. 2, 1944  2 Sheets-Sheet 1
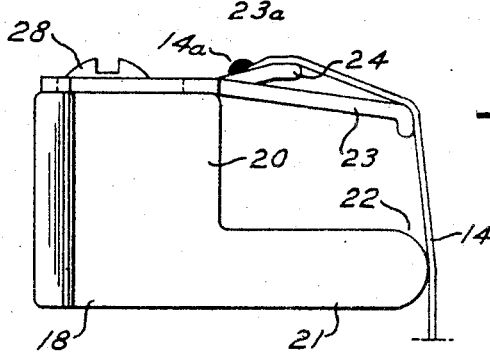
INVENTORS
ALBERT J. WILLIAMS, JR
OLIVE B. TATMAN
BY
Virgil E. Woodcock
ATTORNEY Aug. 12, 1947.  A. J. WILLIAMS, JR., ET AL  2,425,408
FRICTIONAL DAMPING MEANS FOR GALVANOMETERS
Filed Nov. 2, 1944  2 Sheets-Sheet 2
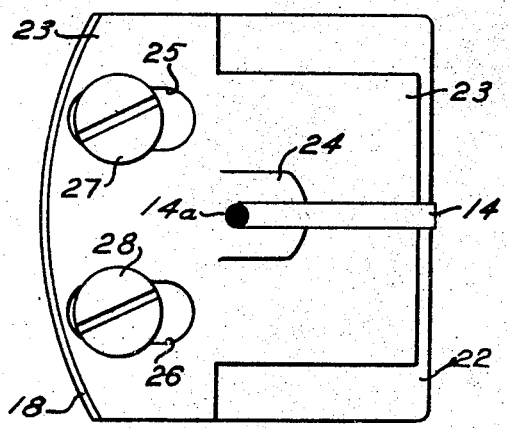
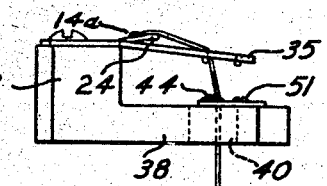
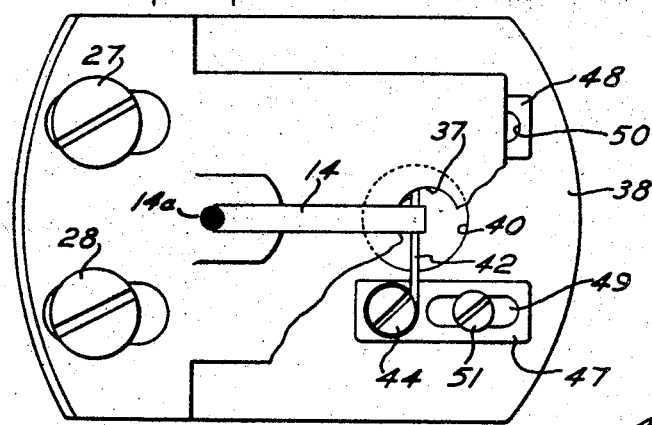
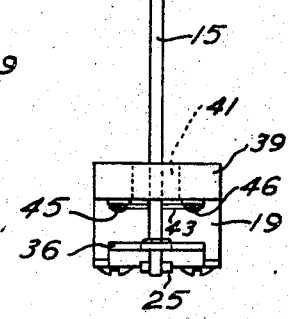
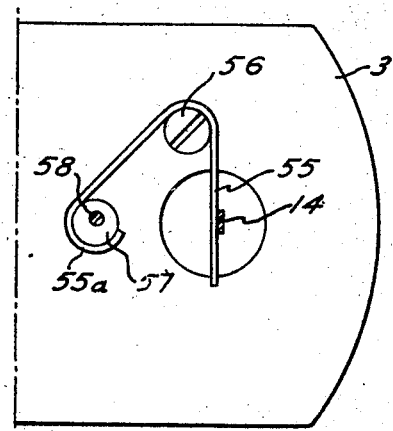
INVENTORS
ALBERT J. WILLIAMS, JR.
OLIVE B. TATMAN
BY
Virgil E. Woodcock
ATTORNEY Patented Aug. 12, 1947

2,425,408

UNITED STATES PATENT OFFICE 2,425,408

FRICTIONAL DAMPING MEANS FOR GALVANOMETERS

Albert J. Williams, Jr., Philadelphia, and Olive B. Tatman, Narberth, Pa., assignors to Leeds and Northrup Company, Philadelphia, Pa., a corporation of Pennsylvania Application November 2, 1944, Serial No. 561,622

12 Claims. (Cl. 171—95)

This invention relates to galvanometers, more particularly, to the suspension means for galvanometer coils, and has for an object the provision of means rapidly to damp out vibrations and oscillations of the galvanometer coil without interfering with the rotation of the coil about the axis of its suspension.

Galvanometers of the type to which the present invention is directed, comprise a movable element whose mass is great compared with that of its suspension system. Such movable elements may comprise a magnetic needle or coil having a plurality of turns. Such a coil generally consists of a plurality of turns of relatively fine, small diameter wire. The coil or movable element is suspended by filamentary means. In the case of the coil the suspension also comprises electrical conductors connected to the respective ends of the coil. In galvanometers of this type the mass of the movable element gives rise to bothersome vibrations or oscillations of such movable element which may persist over a substantial period of time.

It is an object of the present invention to provide frictional means for rapidly damping out undesired vibrations and oscillations without interfering with rotational movement of the movable element about its axis of suspension.

In carrying out the invention in one form thereof, the movable element is supported by filamentary suspensions, secured at their respective ends to the movable element and to spaced spring supports. Frictional means are disposed adjacent the respective supports frictionally to engage the suspensions so that vibrations or mechanical oscillations of any kind and in any direction (other than about the longitudinal axis of the suspensions) produce relative movement between the string and the frictional means. The opposition to movement due to the frictional engagement absorbs the energy from the galvanometer suspension and this has the effect of quickly damping out such undesired vibrations and oscillations. The frictional means may comprise rigid supports, or they may be formed of spring means, with provision for adjusting the degree of the frictional engagement with the filamentary suspension means.

Accordingly, it is a further object of the invention to provide a galvanometer suspension for a coil disposed intermediate the two supports, which suspension is characterized by resilience along the axis of the suspension so that interposed frictional members making light contact with the suspension are effective in damping undesired vibrations without interfering with the rotational movements as caused by current flow through a galvanometer coil.

For a more detailed explanation of the invention, and for further objects and advantages thereof, reference is to be had to the following detailed description taken in conjunction with the accompanying drawings, in which:

Fig. 1 is a front elevation of the suspension element of a galvanometer embodying the invention;

Fig. 2 is a side elevation of Fig. 1;

Fig. 3 is an enlarged view of the upper supporting means of Figs. 1 and 2;

Fig. 4 is a plan view of Fig. 3;

Fig. 5 is a front elevation of the suspension element of a galvanometer embodying a modified form of the invention;

Fig. 6 is an enlarged plan view of the upper supporting device of Fig. 5; and

Fig. 7 is an enlarged plan view of a further modification of the invention.

Referring to Fig. 1, the invention in one form has been shown as applied to a galvanometer having a coil 10, formed by a plurality of turns of wire 11, which turns may be held together by adhesive on the insulation of the wires and/or by bindings 12. One end of the coil is suitably secured, as by soldering, to a small metallic post 13, Fig. 2, to which there is also secured the upper filamentary suspension means 14, as by set screws. The lower filamentary suspension means 15 is also suitably secured to a small metallic post 17, to which the other end of the coil is soldered. The posts 13 and 17 are carried by plates 16 secured to the coil 10 by the bindings 12.

The galvanometer coil 10 is suspended between two supporting members 18 and 19, preferably disposed at right angles to each other. Except for their disposition, these supporting members are of identical construction. In the enlarged views of Figs. 3 and 4 the supporting member 18 includes a body portion 20, from which there extends a projection 21 having a rounded end 22, over which the filamentary conductor 14 passes. This conductor 14 also passes over the outer end of a cantilever spring 23, and is secured, as by soldering as indicated at 14a, to an upturned tab 24. The cantilever spring 23 is provided with a pair of elongated slots, 25 and 26, Fig. 4, through which screws 27 and 28 extend. These screws threadedly engage threaded holes (not shown) in the supporting member 18.

It will be observed, Figs. 1 and 2, that the conductor 14 has its flat side disposed at right angles to the flat side of the conductor 15. In other words, though the filamentary conductor is exceedingly flexible and of very small size, generally in the form of a fine ribbon, it has a somewhat greater width than thickness. The wide portion fits against the rounded end 22 of the projection 21. Similarly, the wide or flat side of the conductor 15 rests against the rounded end 22a of the support 19. The cantilever spring 23, associated with the support 18, and the cantilever spring 23a, associated with the support 19, are adjusted so that the rounded ends 22 and 22a of the respective supports lightly, but relatively firmly, engage the flat sides of the filamentary conductors 14 and 15. These two adjustments are important. If the cantilever springs 23 and 23a were to be so positioned that a relatively strong force would be required to produce relative movement between the conductors and the rounded ends 22 and 22a, little damping effect would be obtained. Though a rectangular conductor has been disclosed, it will be understood, of course, that a round filamentary conductor, or one of a different shape, may be utilized.

In accordance with the invention, the resilient or elastic supports comprising the cantilever springs 23 and 23a are so adjusted that a relatively light, though firm, frictional engagement is obtained between each of the rounded surfaces 22 and 22a and the respective filamentary conductors 14 and 15. As viewed in Fig. 2, it will be apparent that any movement of the coil 10 in the plane of the paper will cause the conductor 14 to slide back and forth along the rounded surface 22. Similarly, as viewed in Fig. 1, any movement of the coil 10 in the plane of the paper will cause the filamentary string 15 to slide back and forth along the rounded surface 22a. The friction opposing such movements absorbs energy from the suspension system as a whole, and serves quickly and effectively to damp out vibrations and mechanical oscillations.

Referring to Figs. 1 and 2, any movement of the coil 10 along the axis of conductors 14 and 15 will produce relative movement between one of the conductors 14 and 15 and the associated rounded surfaces 22 and 22a. Such vertical movements produce up-and-down bending or oscillation of the cantilever springs 23 and 23a. These springs would tend to continue the movements but due to the friction between each conductor and its associated surface, the energy is quickly absorbed and the system as a whole including the coil 10 is rapidly brought to rest. For vertical movements of this character, it will be apparent the supports 18 and 19 need not be at right angles to each other. The rounded surfaces 22 and 22a would work equally as well if disposed in parallel relation.

It is emphasized, the conductors 14 and 15 do not offer frictional resistance against rotation of the coil 10 about their common axis. Their purpose is to maintain the coil 10 in its zero position in the absence of current through that coil and to offer resistance which is generally proportional to the extent of angular movement of the coil. As well understood by those skilled in the art, galvanometers of the type to which this invention relates are exceedingly sensitive devices. Due to the slight opposition offered to the aforesaid rotational movement, currents of exceedingly small magnitude will produce appreciable deflection of the coil 10. Because of the high sensitivity and the small size of the suspensions 14 and 15, and the relatively small tension applied by the cantilever springs 23 and 23a, the movable element of the galvanometer as a whole is particularly susceptible to the foregoing vibrations and undesired movements. Additionally, the galvanometer may, under some circumstances, be subjected to undesired rotations.

Referring to Fig. 1, the upper end of the coil may move to the right while the lower end of the coil moves to the left, and vice versa. This type of movement causes the suspension 15 laterally to slide along the support 22a and to absorb the energy of rotation. The free ends of both of the cantilever springs 23 and 23a tend to move inwardly. This produces a vertical sliding movement of the suspension conductors 14 and 15 over the friction surfaces 22 and 22a and supplements the foregoing absorption of energy. As before, the undesired energy of the system is absorbed quickly to bring the coil 10 to standstill.

Referring to Fig. 2, a further undesired movement of the coil may comprise rotation thereof in a different plane. For example, the upper end of the coil, in Fig. 2, may move to the right while the lower end moves to the left, or vice versa. This movement causes the suspension 14 laterally to slide along the support 22 and to absorb the energy of rotation. The free ends of both of the cantilever springs 23 and 23a tend to move inwardly. This produces a vertical sliding movement of the suspension conductors 14 and 15 over the friction surfaces 22 and 22a, and supplements the foregoing absorption of energy. Again, the undesired energy in the system is frictionally absorbed, quickly to bring the coil to standstill.

Any undesired disturbance of the galvanometer coil 10 and its associated suspensions may be resolved into one or more of the foregoing movements. Regardless of the complexity of the movements of the coil, the frictional means quickly and satisfactorily bring it to standstill.

It is to be further observed that the location, adjustment and character of the energy-absorbing or friction devices are such that they do not interfere with the rotation of the coil 10 about its axis, formed by the conductors 14 and 15. By so locating frictional damping devices, preferably at right angles to each other, and relatively close to the points of support formed by the cantilever springs 23 and 23a, the energy stored in the suspension system is quickly absorbed by these frictional devices. Torque exerted by the coil 10 is at all times effective to rotate it. Rotation of the coil 10 does not produce the energy-absorbing damping action arising by reason of sliding movement of the filamentary suspension means with respect to the surfaces 22 and 22a. There is no such sliding movement and no damping of rotational movement of the coil 10 by the friction devices.

In order to apply some tension to the filamentary suspensions 14 and 15, a spring means must be included in the suspension system. By providing the two cantilever springs 23 and 23a, mechanical shocks and vibrations do not produce a slackening of either of strings 14 or 15. The galvanometer system as a whole moves back and forth along the axis of the conductors 14 and 15. The frictional means is effective at all times. The vertical movements of each of the conductors 14 and 15 relative to their respective rounded surfaces 22 and 22a, are opposed by friction with consequent absorption of energy from the suspension system.

The frictional damping means is effective to absorb energy and damp out vibrations and oscillations which may occur in many directions. Notwithstanding its effectiveness for the many freedoms of movement, nevertheless, the damping means does not interfere with the normal, rotational, movement of the galvanometer about the axis of conductors 14 and 15. For such rotational movements, the galvanometer operates in manner well understood by those skilled in the art and may, in addition to the features of the present invention, be supplied with conventional damping means for such rotational movements.

While the stationary magnetic structure of the galvanometer has been omitted from the drawings, for the sake of clarity, it will of course be understood by those skilled in the art that the coil 10 is mounted between a pair of pole pieces, between which a relatively strong magnetic field is produced. Hence, any current flow through the coil 10 will result in a torque to cause it to deflect in one direction or the other, depending upon the direction of current flow in the coil. By means of a suitable optical system a beam of light may be directed upon a mirror 30, which may be supported by a bracket 31, carried on the upper plate 16 of coil 10. The beam of light is, upon rotation of the coil 10, deflected in manner well understood by those skilled in the art.

Now that the principles of the invention have been explained, additional modifications of the invention may suggest themselves. For example, in Figs. 5 and 6 there has been illustrated a modified form of a damping means. More specifically, the galvanometer coil 10 is again supported by filamentary conductors 14 and 15, these being secured to the upturned tabs 24 and 25 of cantilever springs or resilient supports 35 and 36, each of which is provided with an opening 37, Fig. 6, through which the conductors 14 and 15 extend. The supporting members 18 and 19 are each provided with extensions 38 and 39, in which openings 40 and 41 are provided. Across each of these openings there extends bars 42, Fig. 6, and 43, Fig. 5. The bars may be in the form of round wire, the respective ends of which may encircle fastening screws, one of which, the screw 44, is shown in Fig. 6. In Fig. 5 the bar 43 is shown secured to fastening screws 45 and 46. These fastening screws are threaded into brackets, shown as brackets 47 and 48 in Fig. 6, each of which is provided with elongated slots 49 and 50 to provide for adjustment relative to the fastening screws. One of these screws, the screw 51, is shown in Figs. 5 and 6, while both of the corresponding screws appear just in front of the screws 45 and 46 of Fig. 5.

As explained in connection with the modification of Figs. 1-4, the brackets 47 and 48 are positioned so that the bars 42 and 43 lightly, but firmly, engage the conductors 14 and 15 to permit sliding movement of each conductor with respect thereto, this sliding movement giving rise to adequate friction to insure the absorption of energy. This has the effect of quickly damping the suspension system as a whole, and insures that the galvanometer coil 10 will quickly come to rest after it has been mechanically disturbed by jars or vibrations.

A further modification of the invention is shown in Fig. 7, in which there is mounted, upon the extension 38 of each supporting member, a resilient finger 55, which has been illustrated in the form of a spring wound about a mounting screw 56 with an opposite end 55a encircling a cam 57. As in the two preceding modifications, the frictional engagement of the finger 55 with the suspension conductor 14 may be readily adjusted. More specifically, the cam 57 may be rotated until the extending finger or arm 55 engages the filamentary conductor 14 to produce the desired frictional contact therewith. A fastening screw 58 is then tightened to hold the cam 57 and the end 55a of the spring in the desired position. It will be understood that a similar resilient assembly is disposed on the opposite supporting means with the arm engaging the filamentary conductor 15 along the flat portion thereof, and in a plane substantially at right angles to that of the finger or arm 55.

In each modification of the invention vibrations and movements of the galvanometer in all directions, except about the axis of suspension conductors 14 and 15, are quickly damped out and the galvanometer comes to standstill in a very short period of time. The performance will be better understood when it is realized that the sensitivity of the galvanometer assembly as a whole may be of the order of two thousandths of a microampere; that is, a flow of two thousandths of a microampere will produce on a scale one meter away from the mirror a deflection of one millimeter. Such a galvanometer may have a period of the order of six seconds. With sensitivities of this high order a coil vibration with an amplitude of a quarter of an inch was damped to an amplitude of one-sixteenth of an inch in less than four seconds. In accordance with the invention, the return of the galvanometer to normal after severe mechanical shock has been frequently observed to be less than three seconds.

Without the damping means characterizing the invention, this damping time has been frequently observed to be from fifteen seconds to thirty-five seconds. In other cases, without the invention, the vibration showed no signs of decay, even at the end of thirty-five seconds.

In contrast, the results of the quick return of the galvonometer to normal in a time of the order of three seconds is remarkable, and of great value in instruments of precision. This will be readily understood when it is realized that jars, mechanical shock, or vibrations are frequently of indeterminate origin and occur at indeterminate times. Readings of galvanometers immediately following such disturbances are inaccurate, and if the galvanometers do not return to normal in relatively short periods, critical data may be frequently lost.

It is again emphasized that the movable element, whether it be a coil or a magnetic needle, has a mass which is many times greater than the mass of its suspensions in contrast with bifilar oscillographic elements, where the mass of the movable system, including a tiny mirror, is exceedingly small for the recordation of transient or rapidly changing conditions.

This invention is also applicable to galvanometers of the type which are designed with a certain amount of static unbalance to increase their sensitivity. That is, the unbalance of the coil is such as to oppose the torsion of the suspensions. Because of the static unbalance, there is an inherent dynamic unbalance which makes such galvanometers particularly sensitive to vibrations. In accordance with the present invention, the amplitude of these vibrations is so minimized as to leave the measuring system as a whole unaffected.

In all forms of the invention, the adjustment of each frictional member relative to its associated conductor does two things. If the adjustment decreases the tension of the springs 23 and 23a, the angle between that part of conductor 14 below, and the part above, the surface 22 is made less. If the spring tension is increased by moving the springs 23 and 23a away from surfaces 22 and 22a, the aforesaid angle is increased. Not only is the pressure changed as between the engaging surfaces, but also the area of contact is changed. With the greater angles each flat portion of each conductor is wrapped around, engages, more of the rounded surfaces 22 and 22a.

It may be further observed that the foregoing action will be effective regardless of whether or not the friction surfaces 22 and 22a are disposed at right angles to each other. While such a disposition of those surfaces is preferred, it is to be understood that they will be effective if disposed at any angle one to the other, and as has already been pointed out, they will be effective for certain types of oscillations, when disposed in parallel relation.

In accordance with the modification of Fig. 7, the round spring member 55 adds its own elasticity to the suspension system and substitutes a yielding frictional means 55 for the non-yielding extensions 21 and 22 of Figs. 1–4.

While preferred embodiments of the invention have been described, it will be understood that further modifications may be made without departing from the spirit and scope of the invention as set forth in the appended claims.

What is claimed is:

1. The combination with an electrical measuring instrument, of a rotatable element, spaced resilient supporting means therefor, filamentary suspension means connected to each supporting means and to said rotatable element for mounting it for rotation about a common longitudinal axis of said filamentary means, and means including smooth surfaces slidably engaging said suspension means for rapidly damping out undesired vibrations and oscillations thereof in any direction without interfering with rotational movement of said element about its said axis of suspension.

2. A galvanometer element comprising a rotatable element, filamentary suspension means connected to and extending above and below said rotatable element, said rotatable element having a mass substantially greater than that of said suspension means, supporting means at each end of said suspension means for applying a spring tension to said suspension means and means adjacent each supporting means including smooth surfaces lightly and frictionally engaging said suspension means for rapidly damping out undesired vibrations and oscillations thereof without interfering with rotational movement of said element about its axis of suspension.

3. The combination with an electrical measuring instrument, of a rotatable element, spaced resilient supporting means therefor, filamentary suspension means connected to each supporting means and to said rotatable element for mounting it for rotation about the longitudinal axis of said filamentary means, means for rapidly damping out undesired vibrations and oscillations thereof without interfering with rotational movement of said element about its said axis of suspension comprising a smooth surface adjacent one of said supporting means lightly and frictionally engaging one of said suspension means to provide for frictional and sliding movement in one direction thereof, and a smooth surface adjacent the other of said supporting means lightly and frictionally engaging the other of said suspension means to provide for frictional and sliding movement in a direction at an angle to said first-named direction.

4. In a galvanometer having a coil suspended between two resilient supports by filamentary means for rotation about the longitudinal axis of said filamentary means, the combination of friction means adjacent each of said supports, one of said friction means lightly and frictionally engaging one of said suspension means to resist lateral movement thereof in one plane, said other friction means lightly and frictionally engaging the other of said suspension means to resist lateral movement thereof in a plane at an angle to said first-named plane, and each of said friction means being so constructed and arranged as not to interfere with rotation of said coil about said axis.

5. A galvanometer element comprising a rotatable element, filamentary suspension means connected to and extending above and below said rotatable element, resilient supporting means at each end of said suspension means for applying tension to said suspension means, smooth surfaces disposed at an angle to each other and respectively adjacent each supporting means lightly and frictionally engaging said suspension means for rapidly damping out undesired vibrations and oscillations thereof in all directions without interfering with rotational movement of said element about its axis of suspension.

6. The combination set forth in claim 4, in which said friction means comprises abutting projections one of which engages one of said filamentary means to resist sliding movement thereof in one direction, and the other one of which projections resists sliding movement with respect thereto of the other filamentary means in a direction at an angle to said first-named sliding movement.

7. In a galvanometer having a coil suspended between two resilient supports, the combination of flat filamentary suspension means connected to opposite sides of said coil and to said supports, said filamentary means on one side of said coil having its flat side at an angle to the flat side of said filamentary means on the opposite side of said coil, friction means having smooth surfaces engaging said flat sides of said filamentary means adjacent each of said supports for frictionally damping out all sliding movements of said filamentary means with respect to said friction means.

8. The combination set forth in claim 7 in which each said friction means comprises a member having a rounded surface which lightly presses against its associated filamentary means.

9. Supporting means for a galvanometer coil comprising a pair of supporting members each including spring means, flat-sided filamentary means fastened to each of said supports and to opposite sides of said coil, said supporting members including projecting smooth surfaces disposed at an angle with respect to each other, and each so engaging said filamentary means as to have a component of force from said spring means effective lightly to press said flat sides of said filamentary means against said projections.

10. Damping means for a galvanometer coil suspended between spaced spring-supports by filamentary means comprising a spring finger extending lightly into frictional engagement with one of said filamentary means.

11. Damping means for a galvanometer coil suspended between spaced spring-supports by filamentary means comprising a spring finger extending lightly into frictional engagement with one of said filamentary means, and means for adjusting said spring finger in one direction to increase said frictional engagement and in the other direction to decrease said frictional engagement.

12. A galvanometer element comprising a galvanometer coil, a pair of spring-supports, a filamentary suspension system extending between said coil and said supports, and means disposed at an angle to each other for frictionally engaging said suspension system in the regions of said supports to produce a slight angle in the suspension system at each of said regions, said last-named means being so constructed as to permit slippage laterally and longitudinally of said system of said suspension means over said engaging means rapidly to damp out vibrations of said suspension system.

ALBERT J. WILLIAMS, JR.
OLIVE B. TATMAN.

REFERENCES CITED

The following references are of record in the file of this patent:

UNITED STATES PATENTS

| Number | Name | Date |
| --- | --- | --- |
| 1,263,393 | Ellis | Apr. 23, 1918 |
| 1,750,275 | Legg | Mar. 11, 1930 |
| 1,951,578 | Peters | Mar. 20, 1934 |
| 1,952,161 | Faus | Mar. 27, 1934 |
| 1,982,333 | Thomander | Nov. 27, 1934 |
| 2,291,713 | Hefley | Aug. 4, 1942 |
| 2,356,608 | O'Bryan | Aug. 22, 1944 |